United States Patent
Singh et al.

(10) Patent No.: US 11,166,218 B1
(45) Date of Patent: **\*Nov. 2, 2021**

(54) CONTROL OF HANDOVER BASED ON REMAINING INACTIVITY TIMER DURATION

(71) Applicant: Sprint Spectrum L.P., Overland Park, KS (US)

(72) Inventors: Jasinder P. Singh, Olathe, KS (US); Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/929,177

(22) Filed: Dec. 5, 2019

Related U.S. Application Data

(63) Continuation of application No. 15/794,859, filed on Oct. 26, 2017, now Pat. No. 10,542,475.

(51) Int. Cl.
| | |
|---|---|
| *H04W 36/38* | (2009.01) |
| *H04W 36/24* | (2009.01) |
| *H04W 76/28* | (2018.01) |
| *H04W 72/04* | (2009.01) |
| *H04W 76/30* | (2018.01) |

(52) U.S. Cl.
CPC .......... *H04W 36/38* (2013.01); *H04W 36/24* (2013.01); *H04W 76/28* (2018.02); *H04W 72/048* (2013.01); *H04W 76/30* (2018.02)

(58) Field of Classification Search
None
See application file for complete search history.

(56) References Cited

U.S. PATENT DOCUMENTS

| | | |
|---|---|---|
| 8,254,331 B2 | 8/2012 | Vargantwar et al. |
| 2009/0092056 A1 | 4/2009 | Kitazoe |
| 2013/0196664 A1 | 8/2013 | Yiu et al. |
| 2013/0231115 A1 | 9/2013 | Lin |
| 2014/0092799 A1* | 4/2014 | Jain ...................... H04J 3/1694 370/311 |
| 2014/0321371 A1* | 10/2014 | Anderson ........... H04W 72/042 370/329 |
| 2015/0236985 A1 | 8/2015 | Chandramouli et al. |

* cited by examiner

*Primary Examiner* — Alex Skripnikov
*Assistant Examiner* — Richard Schnell

(57) ABSTRACT

When a serving base station encounters a trigger for handover of a UE to a target base station, the serving base station will responsively predict whether, before the serving base station would direct the UE to handover to the target base station, an inactivity timer for the UE will expire, and the serving base station will then control the handover based on that prediction. For instance, responsive to the predicting being that the inactivity timer will expire before the serving base station would send a handover command message to the UE, the serving base station could forgo engaging in handover-preparation signaling with the target base station for the handover, instead allowing the UE to transition to idle mode upon expiration of the timer, at which point the UE could then engage in idle-mode handover to the target base station.

16 Claims, 4 Drawing Sheets

```
┌─────────────────────────────────────────┐
│  A FIRST BASE STATION RECEIVES FROM A   │
│  CONNECTED-MODE SERVED UE A MEASUREMENT │
│  REPORT INDICATING THAT THE UE IS WITHIN│
│  THRESHOLD STRONG COVERAGE OF A SECOND  │
│  BASE STATION, THE FIRST BASE STATION   │
│  BEING CONFIGURED TO RESPOND TO THE     │
│  MEASUREMENT REPORT BY (A) ENGAGING IN  │
│  HANDOVER SIGNALING WITH THE SECOND     │
│  BASE STATION TO FACILITATE             │
│  CONNECTED-MODE HANDOVER OF THE UE FROM │──34
│  THE FIRST BASE STATION TO THE SECOND   │
│  BASE STATION AND THEN (B) TRANSMITTING │
│  TO THE UE A HANDOVER COMMAND MESSAGE   │
│  DIRECTING THE UE TO TRANSITION FROM    │
│  BEING SERVED BY THE FIRST BASE STATION │
│  TO BEING SERVED BY THE SECOND BASE     │
│  STATION                                │
└─────────────────────────────────────────┘
                     │
                     ▼
┌─────────────────────────────────────────┐
│  RESPONSIVE TO RECEIPT OF THE MEASUREMENT│
│  REPORT, (A) THE FIRST BASE STATION     │
│  PREDICTS THAT, BEFORE THE FIRST BASE   │
│  STATION WOULD SEND THE HANDOVER        │
│  COMMAND MESSAGE TO THE UE, AN INACTIVITY│
│  TIMER FOR THE UE WILL EXPIRE, WHERE THE│
│  INACTIVITY TIMER TIMES ABSENCE OF      │
│  USER-PLANE COMMUNICATION BETWEEN THE UE│
│  AND THE FIRST BASE STATION, AND WHERE  │
│  EXPIRATION OF THE INACTIVITY TIMER     │──36
│  WOULD TRIGGER TRANSITION OF THE UE     │
│  FROM THE CONNECTED MODE TO AN IDLE     │
│  MODE, AND (B) RESPONSIVE TO THE        │
│  PREDICTING, THE FIRST BASE STATION     │
│  FORGOES THE CONNECTED-MODE HANDOVER OF │
│  THE UE TO THE SECOND BASE STATION AND, │
│  INSTEAD, ALLOWS THE INACTIVITY TIMER   │
│  TO EXPIRE                              │
└─────────────────────────────────────────┘
```

Fig. 3

CONTROL OF HANDOVER BASED ON REMAINING INACTIVITY TIMER DURATION

REFERENCE TO RELATED APPLICATION

This is a continuation of U.S. patent application Ser. No. 15/794,859, filed Oct. 26, 2017, the entirety of which is hereby incorporated by reference.

BACKGROUND

A typical wireless communication system includes a number of base stations each providing coverage in which to serve user equipment devices (UEs) such as cell phones, tablet computers, tracking devices, embedded wireless modules, and other wirelessly equipped devices, whether or not user operated. In turn, each base station may sit as a node on a core access network that includes entities such as a network controller and switches and/or gateways, and the core network may provide connectivity with one or more external transport networks such as the public switched telephone network (PSTN) and/or the Internet. With this arrangement, a UE within coverage of the system could engage in air interface communication with a base station and could thereby communicate via the base station with various remote network entities or with other UEs served by the base station.

Such a system could operate in accordance with a radio access protocol, examples of which include, without limitation, Long Term Evolution (LTE) (using orthogonal frequency division multiple access (OFDMA) and single-carrier frequency division multiple access (SC-FDMA)), Code Division Multiple Access (CDMA) (e.g., 1×RTT and 1×EV-DO), Global System for Mobile Communications (GSM), IEEE 802.11 (WIFI), and BLUETOOTH. Each RAT could define its own procedures for registration of UEs, initiation of communications, handover of UEs between base station coverage areas, and other functions.

In practice, each base station coverage area could define an air interface for carrying communications between the base station and UEs, including a downlink from the base station to UEs and an uplink from UEs to the base station. In practice, the air interface could occupy a carrier, which could be frequency division duplex (FDD), having separate ranges of frequency respectively for downlink and uplink communication, or time division duplex (TDD), having a single range of frequency multiplexed over time between downlink and uplink use.

According to the radio access protocol, the air interface could then define various resources and channels for carrying communications between the base station and UEs, including various control-plane communications (e.g., operational control signaling) and user-plane communications (e.g., bearer data such as application-layer communications).

On the downlink, for instance, the air interface could define a reference channel that carries a broadcast reference signal that UEs can measure to evaluate downlink coverage quality, as well as various other downlink control channels for carrying control signaling to UEs, and the air interface could define one or more traffic channels for carrying bearer data and the like to UEs. And on the uplink, the air interface could define an access channel for carrying UE access requests to the base station as well as various other uplink control channels for carrying control signaling to the base station, and the air interface could define one or more uplink traffic channels for carrying bearer data and the like to the base station.

Overview

When a UE initially enters into coverage of such a system, the UE could scan for a best base station coverage area in which to operate, and the UE could then engage in signaling with and via the base station, to register for service. For instance, the UE could evaluate the reference signal from each available coverage area to identify the coverage area with the best downlink coverage (e.g., the coverage area with the highest downlink receive signal receive power (RSRP), with the highest signal-to-noise ratio (e.g., reference signal receive quality (RSRQ), Ec/Io, C/I, etc.), and/or with one or more other desirable attributes). Upon finding such a coverage area, the UE could then engage in signaling with the base station that provides that coverage area, to establish a radio-link-layer connection (e.g., a Radio Resource Control (RRC) connection) between the UE and the base station. Further, the UE could engage in attach signaling with a network controller, and the network could responsively configure itself to serve the UE.

Having an established radio-link-layer connection with the base station, the UE is considered to be in a connected mode (or active mode). In this mode, the UE and base station could exchange user-plane communications with each other. Namely, when the base station has bearer data to transmit to the UE, the base station could transmit that data via to the UE via the UE's radio-link-layer connection. And when the UE has bearer data to transmit to (e.g., via) the base station, the UE could transmit that data to the base station via the UE's radio-link-layer connection. Under certain protocols, such as LTE, the base station could control scheduling of these downlink and uplink communications to occur within available air interface resources, such as on particular sub-carriers and in particular time intervals.

To help conserve resources, such a system could implement an inactivity timer according to which, when no user-plane communication has flowed between the UE and the base station for a threshold period of time, the base station would release the UE's radio-link-layer connection, thereby transitioning the UE from being served by the base station in a connected mode to being served by the base station an idle mode (or dormant mode).

In the idle mode, the UE could operate in a low-power state from which the UE periodically wakes up to check for page messages from the base station. When the network has bearer data to transmit to an idle-mode UE, the base station could thus page the UE, the UE and base station could responsively engage in signaling to re-establish (e.g., newly establish) a radio-link-layer connection, thus transitioning the UE back to the connected mode, and the base station could then transmit the data to the UE via the UE's radio-link-layer connection. Likewise, when an idle-mode UE has bearer data to transmit to (e.g., via) the base station, the UE and base station could engage in signaling to re-establish a radio-link-layer connection, thus transitioning the UE back to the connected mode, and the UE could then transmit the data to the base station via the UE's radio-link-layer connection.

The base station could be configured to apply a predefined inactivity timer period, on the order of six or ten seconds for example. After each instance of user-plane communication (e.g., bearer data) flowing over the air between the base station and the UE, the base station could then restart the inactivity timer to run for that predefined period. Upon expiration of the inactivity timer (i.e., passage of the predefined inactivity timer period from the latest user-plane communication between the base station and the UE), the base station could then release the UE's radio-link-layer connection. Further, the base station could transmit a release signaling-message (e.g., an RRC connection release message) to the UE to notify the UE that the radio-link-layer connection is released, or the UE could apply a corresponding inactivity timer itself to determine when its radio-link-layer connection is released. In either case, the UE could then operate in the idle mode.

In addition, when a UE is served by a base station in the connected mode or in the idle mode, the UE could regularly monitor air interface conditions to help ensure that the UE is served by the strongest or otherwise best coverage area. If the UE determines that coverage from another base station is threshold strong (e.g., threshold stronger than coverage from the UE's serving base station), then the UE could then hand over from its current serving base station (handover source) to the neighboring base station (handover target).

In the connected mode, for instance, the UE could regularly evaluate coverage strength and, upon detecting threshold strong coverage from a target base station, could transmit to its serving base station a measurement report indicating the detected coverage. Deeming this measurement report to be a trigger for connected-mode handover of the UE, the serving base station could then responsively engage in handover-signaling with the target base station to prepare the target base station to serve the UE, and the serving base station could in turn transmit to the UE a handover command message directing the UE to transition to be served by the target base station. Further, the network could update its records to establish that the target base station is now the UE's serving base station.

In the idle mode, on the other hand, the UE could more autonomously hand over from one base station to another. Upon detecting threshold strong coverage from a target base station, the UE could simply transition from idling in its current serving base station's coverage to idling in the target base station's coverage and thus being served instead by the target base station. (Further, if the target base station is in a different tracking area or paging zone than the source base station, the UE could transmit a tracking area update message or the like to the network to help ensure that any paging of the UE would occur in the UE's new serving coverage area.)

While such handover could work well in practice, an issue could arise in processing handover of a connected-mode UE if the inactivity timer for the UE happens to expire before the handover is complete. In particular, a scenario could arise where the UE has reported threshold strong target coverage to its serving base station (or the serving base station otherwise encounters a trigger for handover of the UE) and the serving base station engages in handover-preparation signaling to prepare the target base station to receive handover of the UE, but where the UE's inactivity timer expires before the source base station sends to the UE a handover command message to direct the UE to hand over to the target base station. In this scenario, the target base station would expect to receive the connected-mode handover of the UE per the handover-preparation signaling with the source base station, but that handover would fail because the UE became idle and would thus not receive/process a handover command message from its serving base station. Consequently, the target base station may record this occurrence as a handover failure. Further, the handover preparation would have been a waste of resources.

Disclosed herein is a method and system to help avoid this issue. In accordance with the disclosure, when a serving base station encounters a trigger for handover of a UE to a target base station, the serving base station will responsively predict whether, before the serving base station would direct the UE to handover to the target base station, an inactivity timer for the UE will expire, and the serving base station will then control the handover based on that prediction.

For instance, if the serving base station predicts that the inactivity timer for the UE will not expire before the serving base station would send a handover command message to the UE, then the serving base station could responsively proceed with handover-preparation signaling with the target base station, to facilitate the handover. Whereas, if the serving base station predicts that the inactivity timer for the UE will expire before the serving base station would send a handover command message to the UE, then the serving base station could responsively forgo engaging in handover-preparation signaling with the target base station for the handover, and the serving base station could instead simply allow the inactivity timer to expire. Upon expiration of the inactivity timer, the UE would thus transition to idle mode. And once idle, the UE could then engage in idle mode handover to the target base station as described above.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

FIG. 3 is another flow chart depicting example operations in accordance with the disclosure.

DETAILED DESCRIPTION

The present method and apparatus will be described herein in the context of LTE as an example radio access protocol and associated network arrangement. However, it will be understood that principles of the disclosure can extend to apply in other scenarios as well. Further, even within the context of LTE, numerous variations from the details disclosed may be possible. For instance, elements, arrangements, and operations may be added, removed, combined, distributed, or otherwise modified. In addition, it will be understood that operations described here as being performed by one or more entities could be implemented in various ways, such as by a processing unit executing software instructions for instance.

Figure 1:
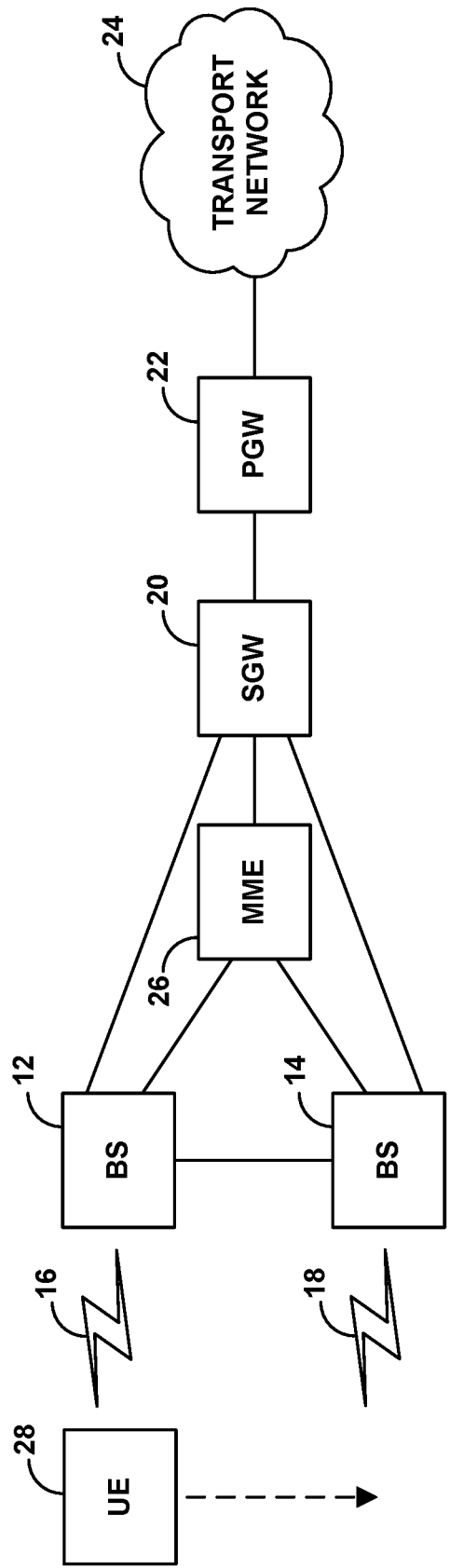
FIG. 1 is a simplified block diagram of a wireless communication system in which the present method and system can be implemented.

Referring to the drawings, as noted above, FIG. 1 is a simplified block diagram of a wireless communication system in which features of the present disclosure can be implemented. In particular, FIG. 1 depicts an example LTE network.

As shown, the example LTE network includes representative LTE base stations 12, 14 (evolved Node-Bs or "eNodeBs") (e.g., macro base stations, small cells, relays, and/or other types of base stations) providing respective wireless coverage areas 16, 18 each defining a respective LTE air interface. Each base station then has a communication interface with a serving gateway (SGW) 20, which in turn has a communication interface with a packet-data network gateway (PGW) 22 that provides connectivity with a transport network 24 such as the Internet. Further, the base stations 12, 14 and SGW 20 have communication interfaces with a mobility management entity (MME) 26, which functions as a network controller, and the base stations 12, 14 have an interface (e.g., X2 interface) with each other. These components of the LTE network could sit as nodes on a core packet-switched network operated by an LTE service provider, and the interfaces between the components could be virtual tunnels defined within that core network.

Under LTE, each air interface operates on a carrier, which could be FDD or TDD as noted above. On the downlink and/or uplink, the carrier could span a frequency bandwidth, such as 1.4 MHz, 3 MHz, 5 MHz, 10 MHz, 15 MHz, or 20 MHz, among other possibilities. In addition, the air interface is divided over time into a continuum of 10-millisecond frames, each of which is then further divided into ten 1-millisecond subframes or transmission time intervals (TTIs). In each TTI, the carrier bandwidth is then divided into a number of 180-kHz-wide frequency blocks, referred to as physical resource blocks (PRBs), which can be modulated to carry data between the base station and UEs. And the base station is configured to allocate those PRBs for use to carry data on an as-needed basis. For instance, when the base station has data to send to a UE, the base station could allocate certain PRBs of a TTI on the downlink to carry that data and could transmit the data to the UE in those allocated PRBs of the TTI. And when a UE has data to send to the base station, the base station could allocate certain PRBs of an upcoming TTI on the uplink to carry the data, and the UE could then transmit the data to the base station in the allocated PRBs of that TTI.

The LTE downlink operates with OFDMA. The downlink is divided over its frequency bandwidth into 15-kHz subcarriers, which are divided into groups of twelve to define the 180-kHz-wide downlink PRBs. Further, each TTI is divided over time into 14 symbol time segments each about 66.7 microseconds long. Thus, the downlink defines an array of resource elements each occupying a 15-kHz subcarrier and spanning 66.7 microseconds. And each PRB encompasses 12×14=168 resource elements. These resource elements could then be modulated using an agreed modulation scheme to carry bits of data from the base station to a UE.

LTE reserves certain of these downlink resource elements for special use. For instance, the resource elements across the downlink bandwidth in the first one, two, or three symbol time segments per TTI are generally reserved to define a downlink control region for carrying control signaling, such as PRB scheduling directives, from the base station to served UEs. And the resource elements in the remaining symbol time segments per TTI are generally reserved to define a shared channel region for carrying data and certain control signaling (e.g., page messages) in PRBs as scheduled by the eNodeB. Further, certain resource elements distributed throughout the downlink bandwidth are reserved to carry a reference signal, which UEs could measure to evaluate coverage as noted above.

The LTE uplink, on the other hand, operates with SC-FDMA. Like the downlink, the uplink is divided over its frequency bandwidth into 15-kHz subcarriers, which are divided into groups of twelve to define 180-kHz-wide uplink PRBs, and each PRB is divided into resource elements that can be modulated to carry bits of data from the UE to the base station. However, on the uplink, each resource element may be effectively spread across the twelve subcarriers of the PRB rather than occupying just a single subcarrier, and may span a shorter duration of time within the PRB.

LTE also reserves certain of these uplink resource elements for special use as well. For instance, certain uplink PRBs at the low end and high end of the uplink frequency bandwidth in each TTI are generally reserved to define an uplink control region for carrying control signaling, such as scheduling requests and measurement reports from UEs to the eNodeB. And the remaining uplink PRBs are generally reserved to define an uplink shared channel region for carrying data in PRBs as scheduled by the eNodeB.

FIG. 1 depicts a representative UE 28 within coverage of base station 12. This UE could take various forms, such as any of those noted above for instance.

When UE 28 initially enters into coverage of the LTE network, the UE could discover coverage of base station 12 and could then engage in a process to register for service as discussed above. For instance, the UE could engage in random access signaling and RRC signaling with the base station to establish an RRC connection (as a form of radio-link-layer connection), putting the UE in an RRC-connected mode, and the base station could establish for the UE a context record keyed to that RRC connection. Further, the UE could engage in an attach process, through which the MME 26 could authenticate the UE and coordinate setup of one or more bearer tunnels of particular quality-of-service classes for carrying communications between the UE and the PGW 22 (and thus between the UE and the transport network 24). Each such bearer could include a radio portion extending between the UE and the base station and an access portion extending between the base station and the PGW via the SGW, and the base station could store an indication of the bearer in its UE context record.

Once the UE is so attached with the network and served by the base station, the base station could then coordinate air interface communication with the UE as necessary. For instance, when the base station has bearer data to transmit to the UE, the base station could schedule transmission of that data to occur in particular downlink PRBs and could accordingly transmit the data to the UE in those PRBs. Likewise, when the UE has data to transmit to the base station, the UE could send a scheduling request to the base station, the base station could schedule transmission of that data to occur in particular uplink PRBs, and the UE could accordingly transmit the data to the base station in those PRBs.

As the base station serves the UE in RRC-connected mode, the base station could also maintain an inactivity timer for the UE as discussed above, to help control release of the UE's RRC connection based on threshold absence of user-plane communication (e.g., scheduled bearer data communication) between the base station and the UE. As indicated above, the base station could be provisioned to use a predefined inactivity time period, which could be on the order of six or ten seconds by way of example (and could be predefined to vary based on factors such as network congestion, resource utilization, or the like). Thus, after completion of each instance of user-plane communication between the base station and the UE, the base station could reset the UE's inactivity timer to time absence of user-plane communication for this period. In practice, the timer could increment or decrement and, in either case, could expire upon passage of the threshold duration of no user-plane communication flowing over the air between the UE and the base station. Variations are possible as well.

Upon expiration of the inactivity timer for the UE, as noted above, the base station could responsively release the UE's RRC connection, possibly sending to the UE an RRC connection-release message to inform the UE of the state change (or the UE could autonomously apply the same timer and establish the state change as well), thus transitioning the UE to an RRC-idle mode. This connection release process could also involve the base station releasing one or more access bearers that were established for the UE and perhaps deleting the UE context record.

As further discussed above, when the UE is served by a base station, the UE could monitor coverage from the base station and neighboring base stations and could provide its serving base station with measurement reports when appropriate. Under LTE, the base station could provision the UE with various measurement events for the UE to use as triggers for providing such measurement reports. For instance, the base station could provision the UE with an "A2" measurement event that causes the UE to provide a measurement report when the UE detects threshold weak coverage from its serving base station, an "A4" measurement event that causes the UE to provide a measurement report when the UE detects threshold strong coverage from a neighboring base station, and an "A5" measurement event that causes the UE to provide a measurement report when the UE detects threshold weak coverage from its serving base station and threshold strong coverage from a neighboring base station.

When the UE thus detects threshold strong enough neighboring coverage for possible handover, the UE could generate and transmit to its serving base station a measurement report that identifies the detected coverage and measured coverage strength, perhaps from both the UE's serving base station and the neighboring base station. And the base station could then determine whether the measurement report is a trigger for handover of the UE to the neighboring base station. For instance, the base station could determine whether the reported neighboring coverage is strong enough (e.g., stronger than a threshold or threshold stronger than the serving base station's coverage).

Upon deeming the measurement report to be a trigger for handover of the UE to the neighboring base station, or otherwise encountering a trigger for handover of the UE to the neighboring base station (perhaps based on one or more other factors), the base station could then engage in a process to coordinate that handover.

Under LTE, a source base station processes handover of a UE to a target base station by engaging in handover-preparation signaling with the target base station and then directing the UE to transition to be served by the target base station. More specifically, after deciding to initiate handover, the source base station could directly or indirectly transmit to the target base station a handover request message carrying UE context information including bearer information. The target base station could then prepare itself to serve the UE and could provide a handover acknowledgement (response) message to the source base station. And the source base station could then transmit to the UE a handover command message (HCM) that directs the UE to transition from being served by the source base station to being served by the target base station. Further, the source base station could notify the target base station that the handover will proceed and could begin forwarding any downlink data received for the UE to the target base station for transmission to the UE, and the network could transfer to the target base station any bearers established for the UE.

According to the present disclosure, at issue when the UE's serving base station encounters a trigger for handover of the UE could be then whether the an inactivity timer for the UE will expire before the handover is complete. For instance, at issue could be whether an inactivity timer for the UE will expire before the serving base station would send to the UE an HCM for the handover.

If the inactivity timer expires before the serving base station would send to the UE an HCM for the handover, then the UE would go idle (transition from RRC-connected mode to RRC-idle mode) before the serving base station would send the HCM to the UE, and consequently, the UE would not receive the HCM from the serving base station. As a result, the target base station would not receive the connected-mode handover of the UE that the target base station prepared to receive. (For instance, the target base station would detect no communication from the UE within a threshold time period after the target base station sent its handover acknowledgement message to the source base station.) And so the target base station may record the occurrence as a handover failure.

Per the present disclosure as noted above, when the serving base station encounters the trigger for handover of the UE, the serving base station will responsively predict whether an inactivity timer for the UE will expire before the serving base station would direct the UE to engage in the handover, and the serving base station will then use that prediction as a basis to control the handover, such as to control whether to allow the handover to proceed.

For purposes of this prediction, the serving base station could assume that the inactivity timer will continue to run for its remaining duration, and the serving base station can thus deem the remaining time of the inactivity timer to be the time remaining until the timer would expire. For instance, if there is just one minute left until the timer would expire, the serving base station could deem the remaining time of the inactivity timer to be one minute. Alternatively, if the serving base station has a basis to predict that there will likely be further user-plane communication to or from the UE before timer expiration (leading to timer reset), the serving base station might conclude that the timer would not continue to run for its duration and thus that the currently-running timer will not expire.

Further, the base station could determine in various ways how much time will pass until the base station would direct the UE to engage in the handover. In LTE and other implementations, this duration could be or comprise a handover-signaling duration, defining the amount of time that will pass as the serving base station engages in signaling directly or indirectly with the target base station to prepare the target base station to receive the handover of the UE, before the serving base station then directs the UE to engage in the handover. Alternatively, this duration could be defined in one or more other ways.

In a representative implementation, the base station could establish and/or be provisioned with data indicating a likely (e.g., historically typical) duration from encountering the trigger until directing the UE to engage in the handover. For instance, the base station could establish such data by monitoring actual durations from encountering handover triggers to directing UEs to hand over. Such data could be specific to particular target base stations, based on the timing and type of the handover trigger at issue, and/or based on one or more other factors.

Typical durations from encountering the handover trigger until directing the UE to handover may be on the order of one two seconds. For example, where the trigger is the base station receiving from the UE a measurement report that indicates the threshold strong target coverage, the base station might be provisioned with data indicating that a likely duration from encountering that trigger until the base station would send an HCM to the UE is likely about one second. Other examples are possible as well.

Upon encountering the handover trigger, the base station could thus determine a remaining time of the inactivity timer and a duration until the base station would transmit a handover directive to the UE, and the base station could compare those time periods with each other to predict whether the inactivity timer will expire before the base station would transmit a handover directive to the UE.

Based on that prediction, the base station could then accordingly either proceed with the handover or abandon the handover. In particular, as noted above, if the base station determines that the inactivity timer for the UE would not expire before the base station would direct the UE to hand over, then the base station could proceed with the handover. Whereas, if the base station determines that the inactivity timer for the UE would expire before the base station would direct the UE to hand over, then the base station could abandon the handover, by not proceeding with handover signaling or the like. Upon expiration of the inactivity timer, the UE would thus go idle, at which time the UE could then engage in idle-mode handover to the target base station if appropriate.

Figure 2:
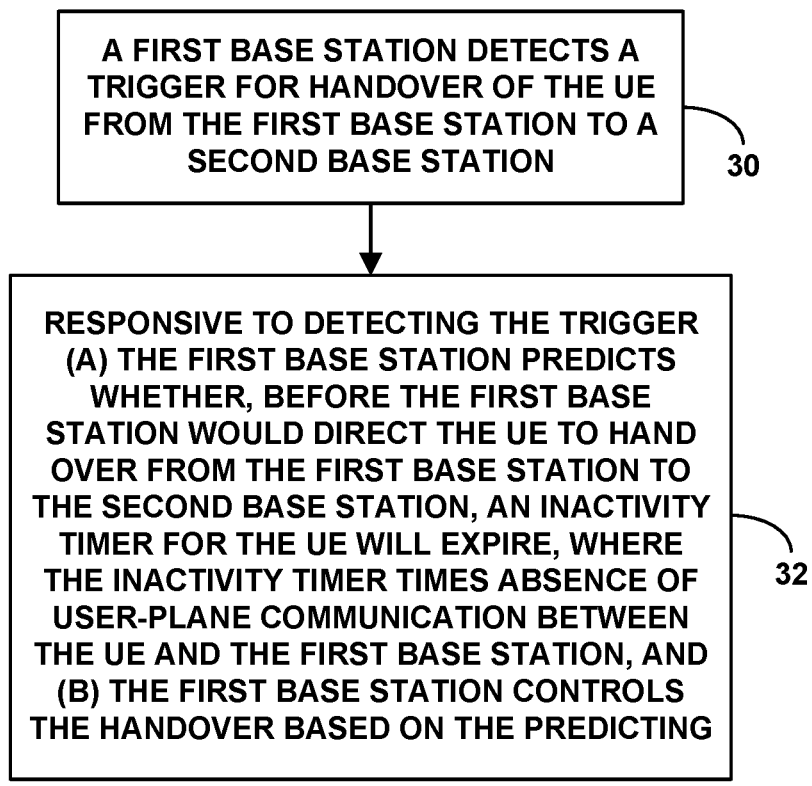
FIG. 2 is a flow chart depicting example operations in accordance with the disclosure.

FIG. 2 is a flow chart depicting a method in line with the discussion above, to control handover in a wireless communication system when a UE is served in a connected mode by a first base station. As shown in FIG. 2, at block 30, the method includes the first base station detecting a trigger for handover of the UE from the first base station to a second base station. Further, at block 32, the method includes responsive to detecting the trigger (a) the first base station predicting whether, before the first base station would direct the UE to hand over from the first base station to the second base station, an inactivity timer for the UE will expire, where the inactivity timer times absence of user-plane communication between the UE and the first base station, and (b) the first base station controlling the handover based on the predicting.

In line with the discussion above, the act of the first base station detecting the trigger for handover of the UE from the first base station to the second base station could involve the first base station receiving, from the UE, signaling indicating that the UE is within threshold strong coverage of the second base station (e.g., with the signaling comprising a measurement report based on measurement by the UE of the coverage of the second base station)

Further, the act of predicting whether the inactivity timer for the UE will expire before the first base station would direct the UE to hand over from the first base station to the second base station could involve comparing a handover-signaling duration with a remaining time of the inactivity timer.

And the act of controlling the handover based on the predicting could involve proceeding with the handover or rather forgoing the handover. For instance, the act of controlling the handover based on the predicting could involve either proceeding with handover-signaling with the target base station (to coordinate and prepare for the handover of the UE) or rather forgoing engaging in such handover-signaling. And as discussed above, engaging in the handover signaling with the second base station could comprise transmitting to the second base station a handover request message requesting handover of the UE to the second base station.

In line with the discussion above, if the prediction is that the inactivity timer for the UE will not expire before the first base station would direct the UE to hand over from the first base station to the second base station, then the first base station may responsively engage in in handover signaling with the second base station to process handover of the UE from the first base station to the second base station. Whereas, if the first base station predicts that the inactivity timer for the UE will expire before the first base station would direct the UE to hand over from the first base station to the second base station, then the first base may responsively forgo engaging in the handover signaling with the second base station and may instead allow the inactivity timer to expire. Expiration of the inactivity timer will then result in transition of the UE from the connected mode to an idle mode in which the UE can then engage in idle-mode handover from the first base station to the second base station.

FIG. 3 is next a flow chart depicting a method in line with the discussion above, to control handover in a wireless communication system in which a UE is served by a first base station.

As shown in FIG. 3, at block 34, the first base station receives from the UE a measurement report indicating that the UE is within threshold strong coverage of a second base station, the first base station being configured to respond to the measurement report by (a) engaging in handover signaling with the second base station to facilitate connected-mode handover of the UE from the first base station to the second base station and then (b) transmitting to the UE a handover command message directing the UE to transition from being served by the first base station to being served by the second base station.

At block 36, however, responsive to receipt of the measurement report, (a) the first base station predicts that, before the first base station would send the handover command message to the UE, an inactivity timer for the UE will expire, where the inactivity timer times absence of user-plane communication between the UE and the first base station, and where expiration of the inactivity timer would trigger transition of the UE from the connected mode to an idle mode, and (b) responsive to the predicting, the first base station forgoes the connected-mode handover of the UE to the second base station and, instead, allows the inactivity timer to expire. As discussed above, after transition by the UE from the connected mode to the idle mode, the UE could then engage in idle-mode handover from the first base station to the second base station.

Various features discussed above can be applied in this context as well.

For example, the act of the first base station predicting that the inactivity timer for the UE will expire before the first base station would send the handover command message to the UE could involve comparing a handover-signaling duration with a remaining time of the inactivity timer. Further, the handover-signaling duration could be a duration that the handover signaling with the second base station to facilitate connected-mode handover of the UE from the first base station to the second base station would take.

As another example, the act of the first base station forgoing the connected-mode handover of the UE to the second base station could involve the first base station forgoing engaging in the handover signaling with the second base station, where engaging in the handover signaling could include transmitting to the second base station a handover request message requesting handover of the UE to the second base station.

Figure 4:
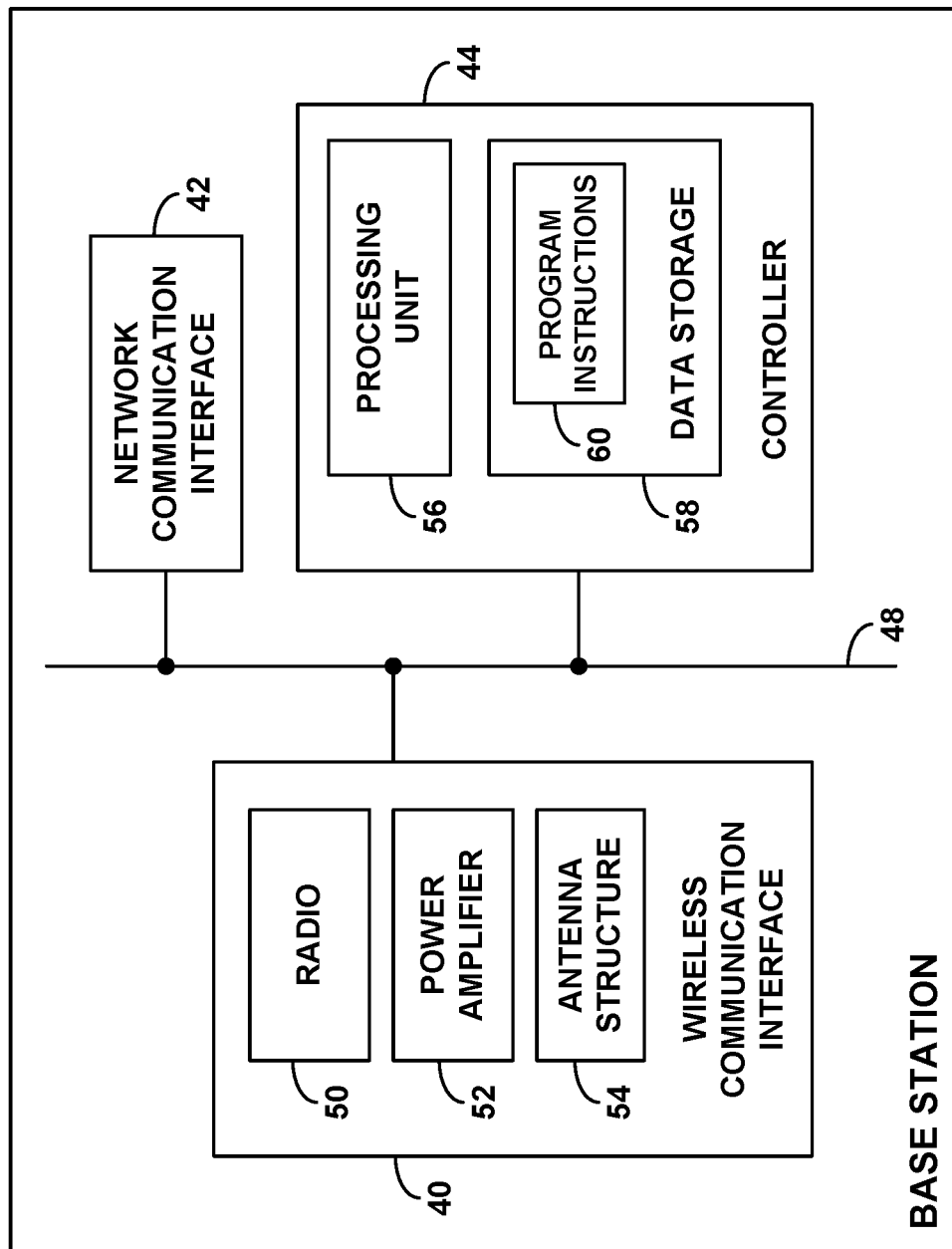
FIG. 4 is a simplified block diagram of an example base station operable in accordance with the disclosure.

Finally, FIG. 4 is a simplified block diagram of an example base station operable in a wireless communication system, showing some of the components that could be included in the base station to facilitate carrying out operations such as those described above, to control handover of a UE served in a connected mode by the base station.

As shown in FIG. 4, the base station includes a wireless communication interface 40, a network (e.g., backhaul) communication interface 42, and a controller 44. These components are shown communicatively linked together by a system bus or other communication link 46, but it will be understood that the components could alternatively be integrated together or distributed in various ways. For instance, aspects of the controller 44 could be provided in a chipset that implements functions of the wireless communication interface 40. Other examples are possible as well.

As shown, the wireless communication interface 40 includes a radio 50 for processing downlink communications and uplink communications, a power amplifier 52 for amplifying downlink communications, and an antenna structure 54 for wirelessly transmitting the downlink communications and wirelessly receiving the uplink communications. Thus, the wireless communication interface facilitates air interface communication between the base station and the served UE.

The network communication interface 42 includes one or more network interface modules (e.g., Ethernet interface circuits for coupling with a core network or the like), through which the base station can communicate with neighboring base stations. And the controller 44 includes a processing unit (e.g., one or more microprocessors) 56, non-transitory data storage (e.g. one or more volatile and/or non-volatile storage components such as magnetic, optical, or flash storage) 58, and program instructions 60 stored in the data storage and executable by the processing unit to carry out various base station operations such as those discussed above.

The controller could thus be programmed or otherwise configured to apply an inactivity timer that times absence of user-plane communication between the UE and the base station, and with expiration of the inactivity timer triggering transition of the UE from the connected mode to an idle mode. Further, the controller could be configured to detect a trigger for handover of the UE from the base station to the neighboring base station and, in response to detecting the trigger, (a) to predict whether the inactivity timer will expire before the base station would direct the UE to engage in the handover and (b) based on the predicting, to control the handover as discussed above.

Various features discussed above can be applied in this context as well, and vice versa.

Exemplary embodiments have been described above. Those skilled in the art will understand, however, that changes and modifications may be made to these embodiments without departing from the true scope and spirit of the invention.

What is claimed is:

1. A method for controlling handover in a wireless communication system when a user equipment device (UE) is served in a connected mode by a first base station, the method comprising:

detecting by the first base station a trigger for handover of the UE from the first base station to a second base station; and responsive to detecting the trigger, (a) predicting by the first base station whether, before the first base station would direct the UE to hand over from the first base station to the second base station, an inactivity timer for the UE will expire, wherein the inactivity timer times absence of user-plane communication between the UE and the first base station, and (b) controlling by the first base station the handover based on the predicting;

wherein predicting by the first base station whether the inactivity timer for the UE will expire before the first base station would direct the UE to hand over from the first base station to the second base station comprises comparing a handover-signaling duration with a remaining time of the inactivity timer.

2. The method of claim 1, wherein detecting by the first base station the trigger for handover of the UE from the first base station to the second base station comprises receiving by the first base station, from the UE, signaling indicating that the UE is within threshold strong coverage of the second base station.

3. The method of claim 2, wherein the signaling comprises a measurement report based on measurement by the UE of the coverage of the second base station.

4. The method of claim 1, wherein controlling the handover based on the predicting comprises determining based on the predicting whether to carry out the handover.

5. The method of claim 1, wherein the first base station serves the UE over an air interface defining an orthogonal frequency division multiple access (OFDMA) downlink and a single-carrier frequency division multiple access (SC-FDMA) uplink.

6. A base station operable in a wireless communication system to control handover of a user equipment device (UE) served in a connected mode by the base station, the base station comprising:

a wireless communication interface, including a radio and an antenna structure, for engaging in air interface communication;

a network communication interface through which to communicate with a neighboring base station; and a controller comprising a processing unit, data storage, and program instructions stored in the data storage and executable by the processing unit, wherein the controller is configured to apply an inactivity timer that times absence of user-plane communication between the UE and the base station, and wherein expiration of the inactivity timer triggers transition of the UE from the connected mode to an idle mode, wherein the controller is further configured to detect a trigger for handover of the UE from the base station to the neighboring base station and, in response to detecting the trigger, (a) to predict whether the inactivity timer will expire before the base station would direct the UE to engage in the handover and (b) based on the predicting, to control the handover, and wherein predicting whether the inactivity timer will expire before the base station would direct the UE to engage in the handover comprises comparing a handover-signaling duration with a remaining time of the inactivity timer.

7. The base station of claim 6, wherein controlling the handover based on the predicting comprises determining based on the predicting whether to carry out the handover.

8. The base station of claim 6, wherein detecting the trigger for handover of the UE from the base station to the neighboring base station comprises receiving via the wireless communication interface, from the UE, signaling indicating that the UE is within threshold strong coverage of the neighboring base station.

9. The base station of claim 8, wherein the signaling comprises a measurement report based on measurement by the UE of the coverage of the neighboring base station.

10. The base station of claim 6, wherein the first base station serves the UE over an air interface defining an orthogonal frequency division multiple access (OFDMA) downlink and a single-carrier frequency division multiple access (SC-FDMA) uplink.

11. Non-transitory data storage storing program instructions executable by a processing unit to carry out operations for controlling handover in a wireless communication system when a user equipment device (UE) is served in a connected mode by a first base station, the operations comprising:

detecting a trigger for handover of the UE from a first base station to a second base station; and responsive to detecting the trigger, (a) predicting whether, before the first base station would direct the UE to hand over from the first base station to the second base station, an inactivity timer for the UE will expire, wherein the inactivity timer times absence of user-plane communication between the UE and the first base station, and (b) controlling the handover based on the predicting;

wherein predicting whether the inactivity timer for the UE will expire before the first base station would direct the UE to hand over from the first base station to the second base station comprises comparing a handover-signaling duration with a remaining time of the inactivity timer.

12. The non-transitory data storage of claim 11, wherein detecting the trigger for handover of the UE from the first base station to the second base station comprises receiving UE signaling that indicates that the UE is within threshold strong coverage of the second base station.

13. The non-transitory data storage of claim 12, wherein the signaling comprises a measurement report based on measurement by the UE of the coverage of the second base station.

14. The non-transitory data storage of claim 11, wherein controlling the handover based on the predicting comprises determining based on the predicting whether to carry out the handover.

15. The non-transitory data storage of claim 11, wherein controlling the handover based on the predicting comprises:

if the predicting is that the inactivity timer for the UE will not expire before the first base station would direct the UE to hand over from the first base station to the second base station, then engaging in handover signaling with the second base station to process handover of the UE from the first base station to the second base station; and if the predicting is that the inactivity timer for the UE will expire before the first base station would direct the UE to hand over from the first base station to the second base station, then forgoing engaging in the handover signaling with the second base station and instead allowing the inactivity timer to expire, whereby expiration of the inactivity timer will result in transition of the UE from the connected mode to an idle mode in which the UE can then engage in idle-mode handover from the first base station to the second base station.

16. The non-transitory data storage of claim 11, wherein the first base station serves the UE over an air interface defining an orthogonal frequency division multiple access (OFDMA) downlink and a single-carrier frequency division multiple access (SC-FDMA) uplink.

* * * * *